United States Patent
Tanada et al.

(10) Patent No.: US 6,794,330 B2
(45) Date of Patent: Sep. 21, 2004

(54) EXHAUST GAS PURIFYING CATALYST

(75) Inventors: Hiroshi Tanada, Okazaki (JP); Osamu Nakayama, Toyota (JP); Keisuke Tashiro, Okazaki (JP); Kinichi Iwachido, Aichi-gun (JP); Tetsuya Watanabe, Okazaki (JP)

(73) Assignee: Mitsubishi Jidosha Kogyo Kabushiki Kaisha (JP)

( * ) Notice: Subject to any disclaimer, the term of this patent is extended or adjusted under 35 U.S.C. 154(b) by 15 days.

(21) Appl. No.: 09/886,145

(22) Filed: Jun. 21, 2001

(65) Prior Publication Data

US 2002/0022573 A1 Feb. 21, 2002

(30) Foreign Application Priority Data

Jun. 22, 2000 (JP) ........................................ 2000-187565

(51) Int. Cl.[7] .......................... B01J 21/08; B01J 21/12; B01J 21/14; B01J 23/00; B01J 23/58
(52) U.S. Cl. ........................ 502/261; 502/243; 502/252; 502/257; 502/262; 502/327; 502/328; 502/330; 502/332; 502/333; 502/334; 502/339; 502/527.12
(58) Field of Search ................................. 502/242, 243, 502/246–248, 252, 257, 261, 262, 306, 308, 309, 311, 312, 313, 317, 320, 322, 323, 327, 328, 330, 332–334, 339, 527.12, 341, 344, 349, 351, 354; 423/213.2, 213.5

(56) References Cited

U.S. PATENT DOCUMENTS

| | | | | |
|---|---|---|---|---|
| 3,929,670 A | * | 12/1975 | Kudo et al. ............. | 262/455 R |
| 4,221,768 A | * | 9/1980 | Inoue et al. ................ | 423/239 |
| 5,208,202 A | * | 5/1993 | Muramatsu et al. ........ | 502/302 |
| 5,270,024 A | * | 12/1993 | Kasahara et al. ......... | 423/213.2 |
| 5,354,720 A | * | 10/1994 | Leyrer et al. .................. | 502/64 |
| 5,409,671 A | * | 4/1995 | Takemoto et al. .......... | 422/180 |
| 5,427,989 A | * | 6/1995 | Kanesaka et al. ............. | 502/66 |
| 5,443,803 A | * | 8/1995 | Mizuno et al. .......... | 423/213.2 |
| 5,494,878 A | * | 2/1996 | Murakami et al. .......... | 502/304 |
| 5,677,258 A | * | 10/1997 | Kurokawa et al. .......... | 502/303 |
| 5,681,788 A | * | 10/1997 | Kanesaka et al. ............. | 502/65 |
| 5,762,892 A | * | 6/1998 | Kasahara et al. ......... | 423/213.5 |
| 5,911,960 A | * | 6/1999 | Miyoshi et al. .......... | 423/213.5 |
| 5,948,376 A | * | 9/1999 | Miyoshi et al. .......... | 423/213.5 |
| 5,990,038 A | * | 11/1999 | Suga et al. .................. | 502/303 |
| 6,066,587 A | * | 5/2000 | Kurokawa et al. ............ | 502/66 |
| 6,149,877 A | * | 11/2000 | Ogai .......................... | 422/180 |
| 6,159,897 A | * | 12/2000 | Suzuki et al. ............... | 502/351 |
| 6,182,443 B1 | * | 2/2001 | Jarvis et al. .................. | 60/274 |
| 6,221,804 B1 | | 4/2001 | Yamada et al. | |
| 6,348,430 B1 | * | 2/2002 | Lindner et al. ............. | 502/304 |
| 6,426,316 B2 | * | 7/2002 | Tanaka et al. .............. | 502/340 |
| 6,537,946 B1 | | 3/2003 | Tanada et al. | |

FOREIGN PATENT DOCUMENTS

EP 1 008 378 A1 6/2000

* cited by examiner

Primary Examiner—Cam N. Nguyen
(74) Attorney, Agent, or Firm—Rossi & Associates (57) ABSTRACT

It is an object of the present invention to provide an exhaust gas purifying catalyst formed as a single catalyst that has a great deal of flexibility when being assembled into an exhaust system and that is capable of executing both an NOx absorbing function and a three-way function in a desired manner. To attain the this object, an absorbent catalyst layer to which an absorbent agent such as potassium and an acid material such as zeolite are added, an absorbent agent block layer formed of zeolite, and a three-way catalyst layer to which an acid material such as phosphorus is added are bonded together on a cordierite carrier. The acid material in the absorbent catalyst layer and the absorbent agent block layer inhibit the movement of the absorbent agent to the three-way catalyst layer, and transform the absorbent agent into harmless and stable potassium phosphate even if the absorbent agent reaches the three-way catalyst.

25 Claims, 10 Drawing Sheets

EXHAUST GAS PURIFYING CATALYST

FIELD OF THE INVENTION

The present invention relates to an exhaust gas purifying catalyst, and more particularly to an exhaust gas purifying catalyst that is capable of executing both an NOx absorbing function and a three-way function.

BACKGROUND OF THE INVENTION

A lean combustion type engine such as a lean burn engine and a direct injection type engine is operated at a leaner air-fuel ratio than a stoichiometrical air-fuel ratio in a predetermined operating range in order to improve the fuel economy characteristics and the exhaust gas characteristics. However a three-way catalyst cannot sufficiently purify NOx in the exhaust gases while the engine is operated at the lean air-fuel ratio. Accordingly, it is known that while the engine is operated at lean air-fuel ratio, nitrogen oxide (NOx) is absorbed from exhaust gases in oxide atmosphere and the absorbed NOx is reduced to nitrogen ($N_2$) in reduced atmosphere so as to reduce the output of NOx into the air.

To provide a catalyst with an NOx absorbing function, alkali metals and alkali earth metal, which can be nitrate such as potassium (K) and barium (Ba), are added as an absorbent agent to a catalyst so that the catalyst can function as an NOx absorbent catalyst as disclosed in Japanese laid-open Patent Publication No. 9-85093.

Figure 8:
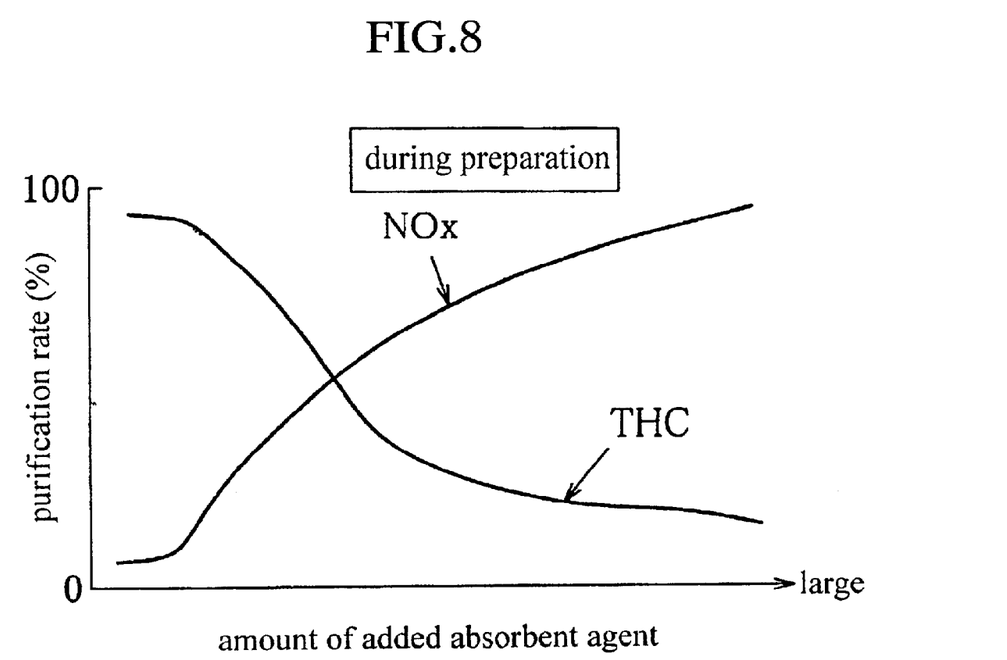
FIG. 8 an explanation drawing showing the purification rates of NOx and THC with respect to the quantity of added absorbent agent during preparation of a catalyst.
Figure 9:
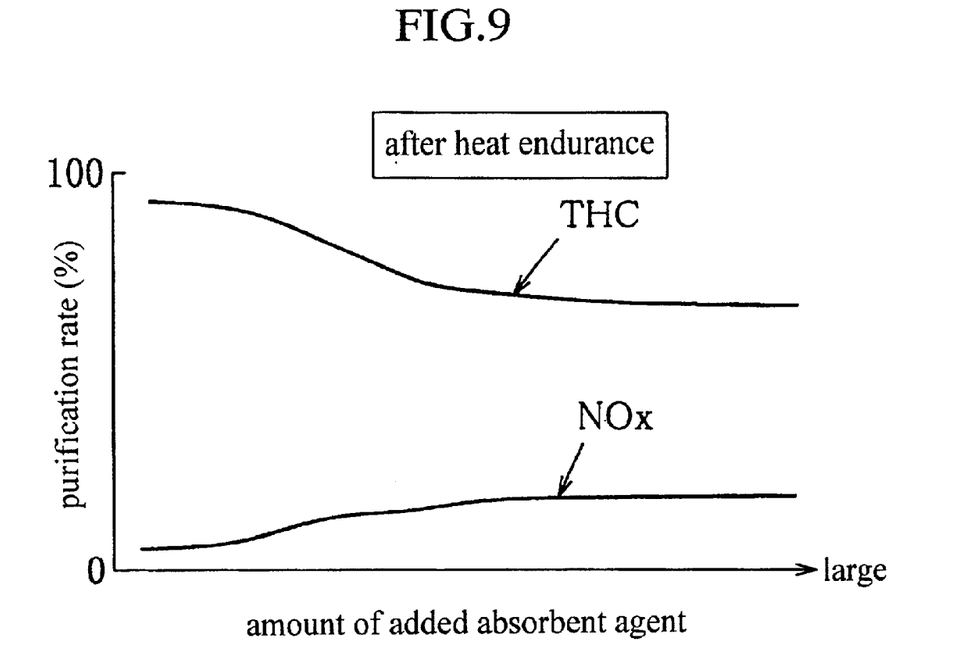
FIG. 9 is an explanation drawing showing the purification rates of NOx and THC with respect to the quantity of added absorbent agent after heat is endured.

FIG. 8 shows an NOx purification rate (a value which is measured fifteen seconds after the air-fuel ratio changes to the lean air-fuel ratio) and the total HC (THC) purification rate (a value which is measured at an air-fuel ratio of 30). As is clear from FIG. 8, the NOx absorbing function and the three-way function (the oxidization/reducing function) have a tradeoff relationship. FIG. 9 shows the function expressing a relationship between the NOx purification rate and the THC purification rate after a heat endurance test and the amount of absorbent agent added to a catalyst. During the heat endurance test, a part of the absorbent agent dissipates due to vaporization at a high temperature and the consumption resulting from reaction of the absorbent agent and a cordierite carrier. For this reason, the NOx purification rate after the heat endurance test is lower than that before the heat endurance test, although the THC purification rate after the heat endurance test is higher than that before the heat endurance test. Thus, the NOx purification rate and the THC purification rate have a tradeoff relationship as is the case with FIG. 9. It is therefore difficult for a single catalyst to execute both the NOx absorbing function and the three-way function in a desired manner. Since operation at only the lean air-fuel ratio cannot satisfy a driver's output requirement, a catalyst system needs to execute the three-way function of purifying CO and HC generated during operation at both the stoichiometrical air-fuel ratio and the rich air-fuel ratio. The three-way function is also required for reducing NOx, which is absorbed during the operation at the lean air-fuel ratio. Thus, in order to assure the three-way function, it is ordinarily necessary to intentionally inhibit the NOx absorbing function by restricting the amount of added absorbent agent or forming the absorbent agent by a material having a low absorbent capability. Therefore, a single catalyst cannot satisfactorily execute both the NOx absorbing function and the three-way function. To execute both functions in a desired manner, it is necessary to separately provide an NOx catalyst, which is specialized in absorbing NOx (to which a sufficient amount of absorbent agent is added), and a normal three-way catalyst.

SUMMARY OF THE INVENTION

It is therefore an object of the present invention to provide an exhaust gas purifying catalyst that is configured as a single catalyst and is able to execute both an NOx absorbing function and a three-way function in a desired manner.

To attain the above object, the present invention provides an exhaust gas purifying catalyst which includes a carrier, an NOx absorbent catalyst layer and a three-way catalyst layer, and in which at least one absorbent agent selected from a group of alkali metals and alkali earth metals is added to the NOx absorbent catalyst layer, the exhaust gas purifying catalyst wherein: an effect inhibiting material for inhibiting an effect of the absorbent agent on the three-way catalyst is added to at least one of the NOx absorbent catalyst layer and the three-way catalyst. The absorbent agent, which reaches the three-way catalyst, disturbs the CO and HC absorption onto the noble metal of the three-way catalyst due to its electron donating property and moves on a noble metal active surface to cover the surface. The effect inhibiting material inhibits such adverse effects. Consequently, the NOx absorbent catalyst layer and the three-way catalyst layer can be formed on one carrier to thereby form a single catalyst that is able to execute the NOx absorbing function and the three-way function by the NOx absorbent catalyst layer and the three-way catalyst layer, respectively.

BRIEF DESCRIPTION OF THE DRAWINGS

The invention will now be described with reference to certain embodiments thereof and the accompanying drawings, in which like reference characters designate the same or similar parts throughout the figures and wherein.

DETAILED DESCRIPTION OF THE INVENTION

First Embodiment

There will now be described an exhaust gas purifying catalyst according to the first embodiment of the present invention with reference to the accompanying drawings.

Figure 1:
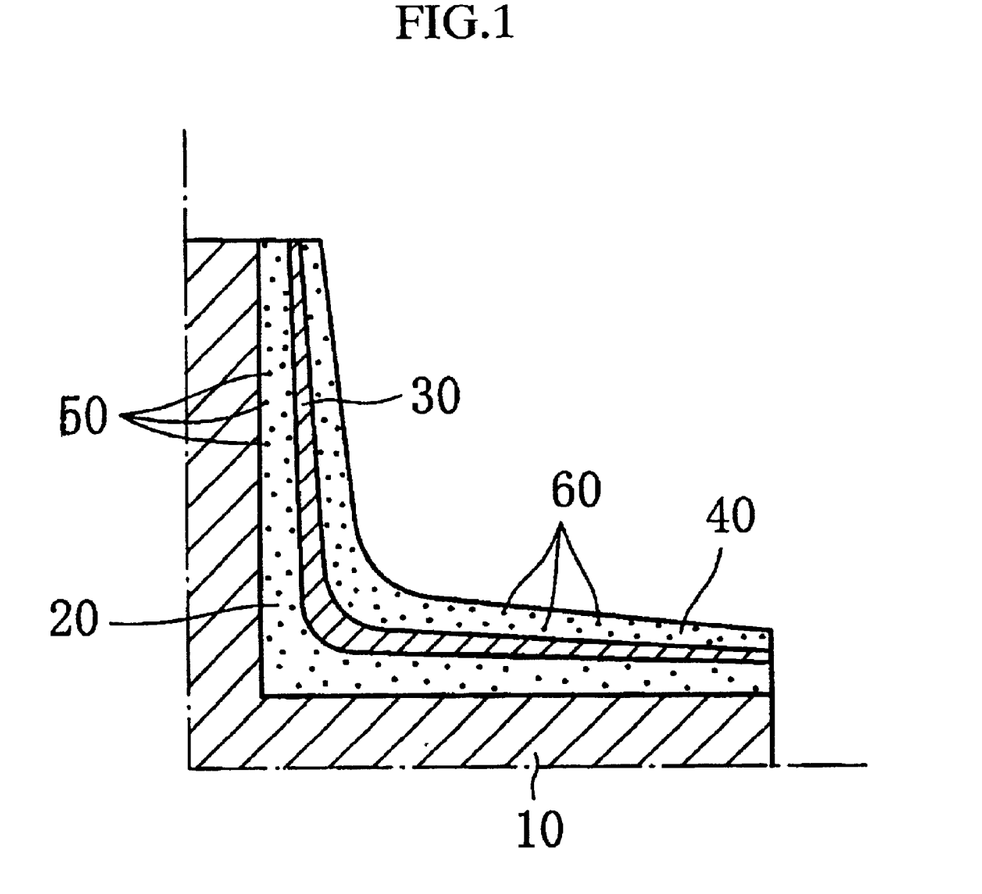
FIG. 1 is a local enlarged sectional view showing a quarter of one cell that is formed in an exhaust gas purifying catalyst according to the first embodiment.

The exhaust gas purifying catalyst according to the present embodiment is configured as a catalyst having a honeycomb (monolith) cordierite carrier that is comprised of many cells. FIG. 1 shows a quarter of one cell that is formed in the exhaust gas purifying catalyst according to the present embodiment. For example, a cell of the cordierite carrier 10 has a square shape. For example, the cordierite carrier 10 is produced by mixing alumina powders, silica powders and magnesia powders in such a manner that the ratio of alumina, silica and magnesia can be equal to a cordierite composition, then dispersing the mixture into the water, forming a solid content thereof into a honeycomb form, and sintering the honeycomb compact.

An absorbent catalyst layer 20 composing an NOx absorbent catalyst layer is formed on the surface of the cordierite carrier 10, and an absorbent agent block layer 30 is formed on the surface of the absorbent catalyst layer 20. A three-way catalyst layer 40 is formed on the surface of the absorbent agent block layer 30. As described hereinbelow, the absorbent catalyst layer 20 mainly executes an NOx absorbing function, the three-way catalyst layer 40 mainly executes a three-way function, the absorbent agent block layer 30 mainly functions as an inhibiting layer that inhibits the movement of an absorbent agent in the absorbent catalyst layer 20 to the three-way catalyst layer 40.

For example, the absorbent catalyst layer 20 is formed in the following manner. First, a slurry is prepared that includes noble metal such as platinum (Pt); an absorbent agent formed of alkali metal, alkali earth metal, etc. such as potassium (K) and barium (Ba); acid material such as zeolite; and the like. The cordierite carrier 10 is then immersed in the slurry and is sintered after drying. Consequently, acid material 50 is mixed as an effect inhibiting material in the absorbent catalyst layer 20 including the noble metal and the absorbent agent.

Figure 2:
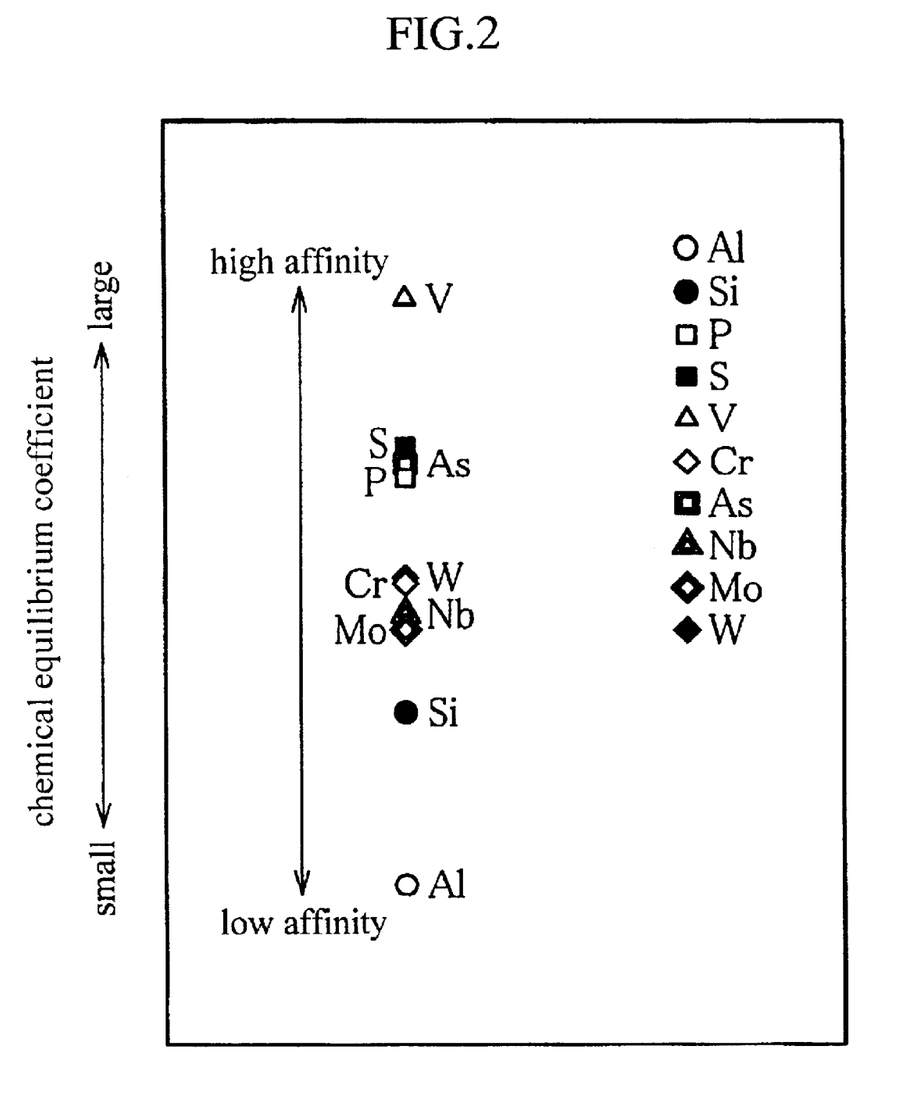
FIG. 2 is an explanation drawing showing the affinity of acid material to potassium.

The absorbent agent is typically formed of potassium or barium, but it may be formed of any other materials insofar as they are alkali metals or alkali earth metals. According to the present embodiment, a sufficient amount of absorbent agent is added to the absorbent catalyst layer 20 so as to surely execute a satisfactory NOx absorbing function according to the characteristics in FIG. 8. The acid material 50 for fixing the absorbent agent is preferably composed of a transition element in the IV group, the V group and the VI group as shown in FIG. 2, or a typical element in the IV group, the V group and the VI group (e.g. Si, P, S, V, Cr, As, Nb, Mo, and W) and has a high affinity with respect to alkali metals or alkali earth metals (FIG. 2 shows the affinity with respect to, e.g. potassium). In view of the reactivity with the absorbent agent, the acid material 50 is preferably composed of silicon (Si) or tungsten (W) that does not disturb the reaction of NOx and the absorbent agent in the case where the absorbent agent is composed of potassium.

Figure 3:
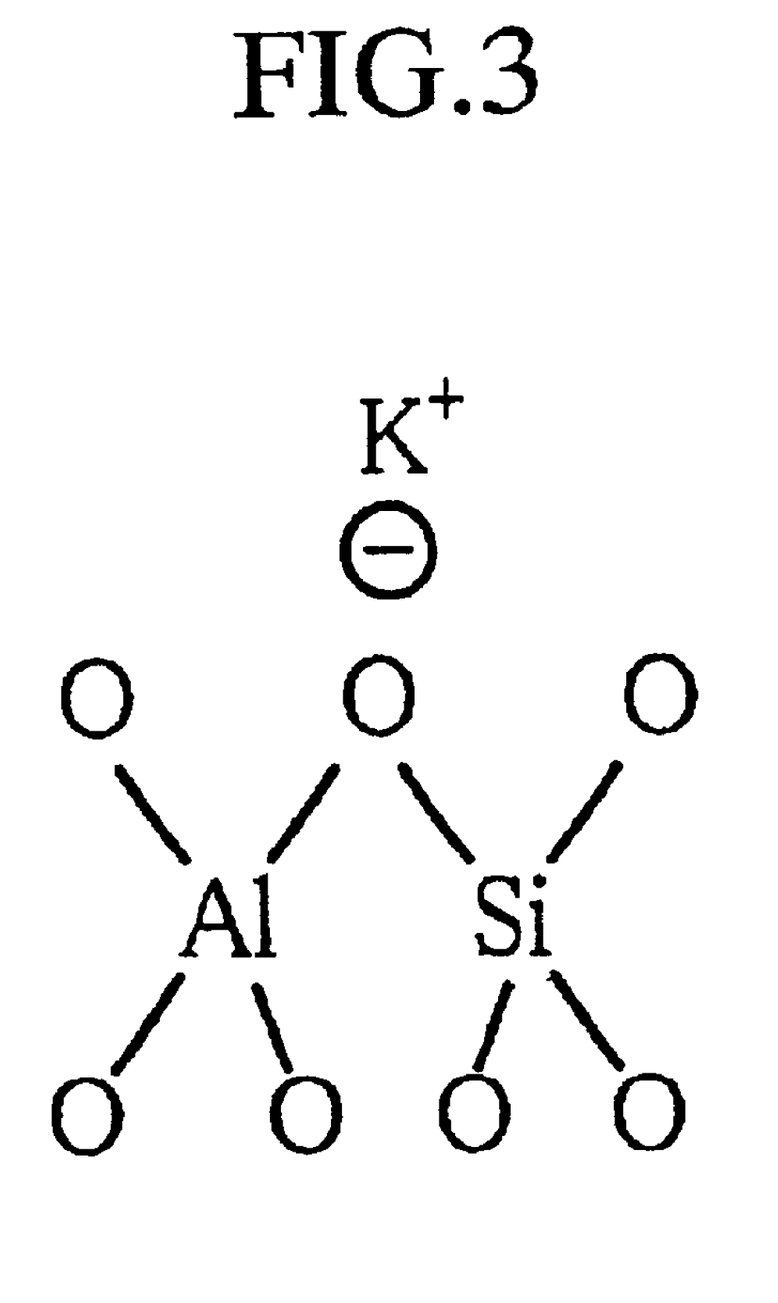
FIG. 3 is a conceptual drawing showing a potassium fixing operation carried out by a cation exchange ability of zeolite.

In particular, the acid material 50 preferably includes at least one of zeolite and titanium dioxide ($TiO_2$). For example, the zeolite as a complex oxide has an excellent capability to fix an absorbent agent (potassium in this embodiment) by its cation exchange ability. The absorbent agent, which moves within the absorbent catalyst layer 20, may be ionized in high-temperature water moisture. As shown in the conceptual diagram of FIG. 3, the cation exchange ability of the zeolite is in reverse proportion to a ratio of $SiO_2$ to $AlO_2$, and the heat-resisting property of the zeolite is in proportion to this ratio. More specifically, if the ratio of $SiO_2$ to $AlO_2$ is small, the absorbent agent fixing property can be intensified because acid points increase with the increase in the quantity of alumina. The small ratio of $SiO_2$ to $AlO_2$ also causes decomposition of alumina with a low heat-resisting property and thus deteriorates the heat-resisting property of the acid material 50 itself. Accordingly, the ratio is preferably determined according to the absorbent agent fixing action and the heat-resisting property. The acid material 50 may be either a natural product or a synthetic product, but it may preferably have a large specific surface area so as to assure a large physical absorption area.

On the other hand, the absorbent agent block layer 30 is formed on the surface of the absorbent catalyst layer 20, e.g. in the following manner. First, a slurry including zeolite components is prepared, and the cordierite carrier 10 on which the absorbent catalyst layer 20 has already been formed is immersed in the slurry. The cordierite carrier 10 is then dried and sintered so that the absorbent agent block layer 30 can be formed on the surface of the absorbent catalyst layer 20.

The absorbent agent block layer 30 formed of zeolite has acid points having the cation exchange ability. As described above with respect to the absorbent catalyst layer 20, the zeolite has an excellent capability to fix the absorbent agent. When the absorbent agent, which moves from the absorbent catalyst layer 20 to the absorbent agent block layer 30 is ionized in high-temperature water moisture, the absorbent agent is fixed as ions by the cation exchange ability of the acid points in the zeolite. The absorbent agent block layer 30 has a three-dimensional reticulated structure and has a large specific surface area. Since the potassium is highly dispersed on the absorbent agent block layer 30, it cannot easily enter the three-way catalyst layer 40.

The absorbent agent block layer 30 may be composed of various types of zeolite such as an MFI type, a Y type, an X type, mordenite and ferrierite. The zeolite conforming to the exhaust gas composition is selected in view of the structural relationship between the zeolite and the absorption class HC. As has been described with respect to the absorbent catalyst layer 20, the cation exchange ability of the zeolite is in reverse proportion to a ratio of $SiO_2$ to $AlO_2$, and the heat-resisting property of the zeolite is in proportion to this ratio. Thus, the ratio is preferably determined according to the absorbent agent fixing action and the heat-resisting property.

On the other hand, the three-way catalyst layer 40 is formed on the surface of the absorbent agent block layer 30 in, e.g. the following manner. First, a slurry is prepared which includes noble metal such as platinum (Pt), palladium (Pd) and rhodium (Rh), and acid materials. The cordierite carrier 10, on which the absorbent catalyst layer 20 and the absorbent agent block layer 30 have already been formed, is immersed in the slurry. The cordierite carrier 10 is then dried and sintered so that the three-way catalyst layer 40 can be formed on the surface of the absorbent agent block layer 30. An acid material 60 as an effect inhibiting material is mixed in the three-way catalyst layer 40. To satisfactory execute the three-way function, no absorbent agent is added to the three-way catalyst layer 40 according to the characteristics in FIG. 8 of the present embodiment.

The acid material 60 includes a material for reacting with a stable substance by inhibiting a very high electron donating property of the absorbent agent formed of alkali salt. For example, this material is silica ($SiO_2$) or tungsten (W), and more preferably, phosphorus (P) that strongly reacts with alkali.

The absorbent agent such as potassium and barium included in the absorbent catalyst layer 20 of the catalyst that is constructed in the above-mentioned manner is fixed in the absorbent catalyst layer 20 by the cation exchange ability of the acid material 50 such as zeolite. This fixing action prevents the vaporization of the absorbent agent at a high temperature and the reaction consumption resulting from the movement of the absorbent agent to the cordierite carrier 10, and also inhibits the movement of the absorbent agent to the three-way catalyst layer 40.

The absorbent agent block layer 30 helps to inhibit the movement of the absorbent agent to the three-way catalyst layer 40. Even if the absorbent agent is removed from the absorbent catalyst layer 20, the absorbent agent does not easily reach the three-way catalyst layer 40 because the absorbent agent is fixed as ions in the absorbent agent block layer 30 by the cation exchange ability of the acid point and is highly dispersed in the absorbent agent block layer 30 having a large specific surface area.

On the other hand, even if the absorbent agent reaches the three-way catalyst layer 40 regardless of the movement inhibiting action by the acid material in the absorbent catalyst layer 20 and the absorbent agent block layer 30, the absorbent agent reacts with the acid material in the three-way catalyst layer 40 and thus transforms into a harmless and stable substance. If, for example, the potassium is added as the absorbent agent to the absorbent catalyst layer 20 and the phosphorus is added as the acid material to the three-way catalyst layer 40, the potassium having moved to the three-way catalyst layer 40 reacts with the phosphorus and transforms into potassium phosphate.

The potassium phosphate is a very stable substance, which has no electron donating property or has no property of moving on a noble metal active surface of the three-way catalyst layer. Thus, even if the absorbent agent moves from the absorbent catalyst layer 20 onto the three-way catalyst layer 40, it is possible to prevent the following adverse effects: the electron donating property of the absorbent agent disturbs the CO and HC absorption onto the noble metal and the absorbent agent moves on the noble metal active surface to cover the surface. Consequently, the absorbent catalyst layer 20 including the absorbent agent and the three-way catalyst layer 40 including no absorbent agent can be formed on the cordierite carrier 10 to thereby form a single catalyst.

This catalyst absorbs NOx as nitrate in exhaust gases emitted from the engine that is operating at the lean air-fuel ratio due to the operation of the absorbent agent dispersed in the absorbent catalyst layer 20. While the engine is operating at the rich air-fuel ratio, the absorbent agent emits nitrate that reacts with CO, etc. on the noble metal of the three-way catalyst layer 40 and is reduced into nitrogen. The nitrogen is then emitted from the catalyst.

The absorbent catalyst layer 20 is capable of satisfactorily executing the NOx absorbing function since a sufficient amount of absorbent agent is added to it. The three-way catalyst layer 40 is capable of satisfactorily executing the three-way function because no absorbent agent is added. It is therefore possible to prevent the above-mentioned adverse effects of the absorbent agent. The three-way catalyst layer 40 surely purifies NOx and also purifies CO and HC, which are generated while the engine is operating at the stoichiometrical and rich air-fuel ratios. The exhaust gas purifying catalyst according to the present embodiment is very advantageous because it is configured as a single catalyst that can be manufactured at a low cost and it can execute the NOx absorbing function and the three-way function in a desired manner.

Figure 4:
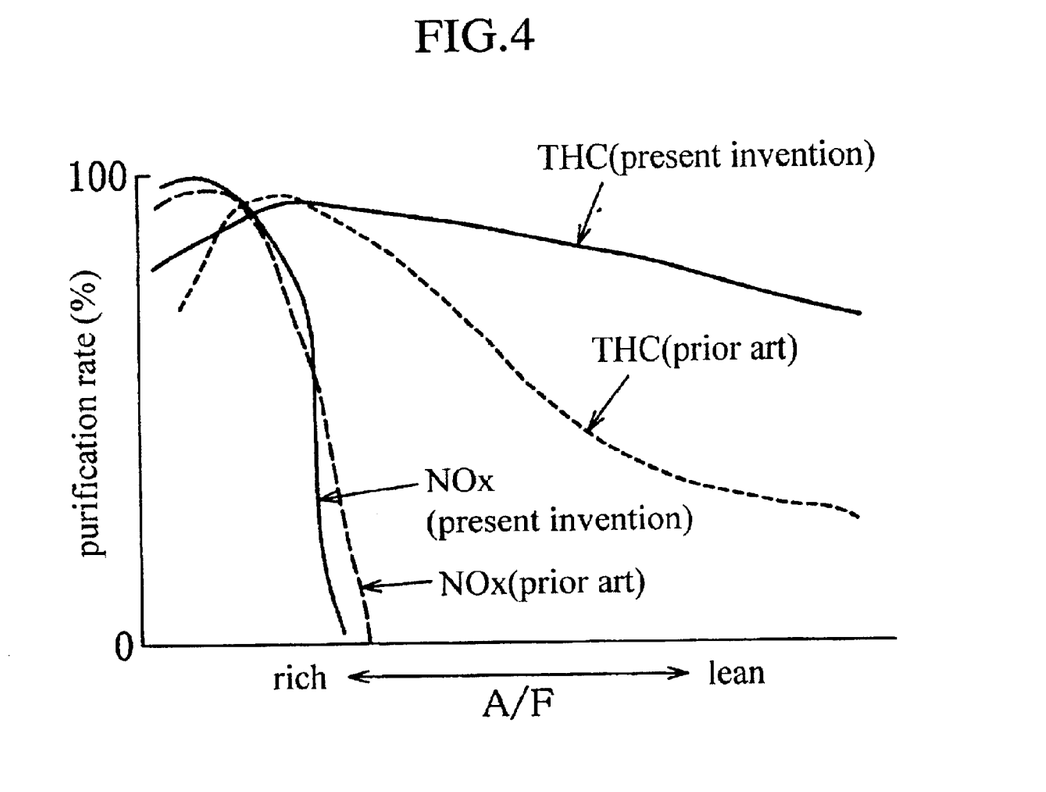
FIG. 4 is an explanation drawing showing the purification rates of NOx and THC with respect to the air-fuel ratio.

FIG. 4 shows the purification rates of NOx and THC with respect to the air-fuel ratio. A conventional catalyst indicated by a broken line in FIG. 4 can achieve the preferable NOx purification rate but cannot achieve the satisfactory THC purification rate because the NOx absorbing function is given priority (the amount of added absorbent agent is increased). To the contrary, the catalyst according to the present embodiment can achieve the satisfactory purification rate with respect to the THC as well as NOx.

Second Embodiment

There will now be described an exhaust gas purifying catalyst according to the second embodiment of the present invention.

Figure 5:
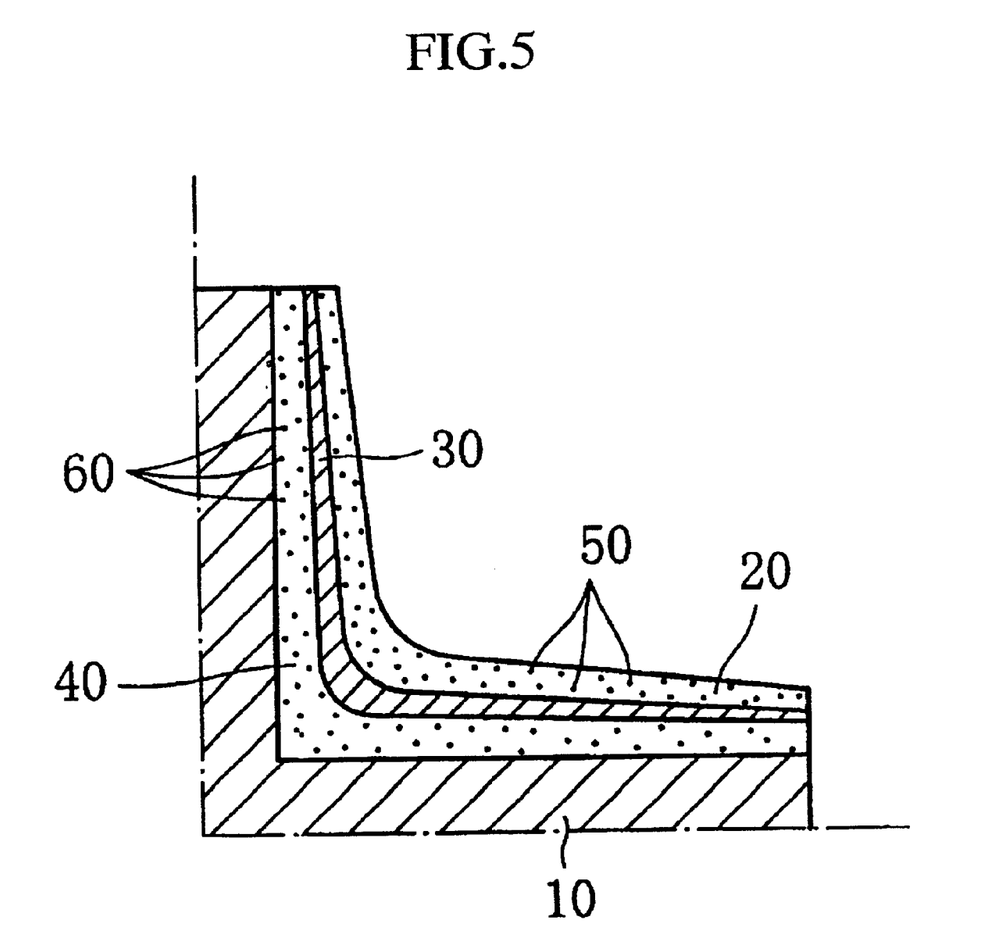
FIG. 5 is a local enlarged sectional view showing a quarter of one cell that is formed in an exhaust gas purifying catalyst according to the second embodiment.

As shown in FIG. 5, the exhaust gas purifying catalyst in the present embodiment is constructed in the same manner as in the first embodiment except that the absorbent catalyst layer 20 and the three-way catalyst layer 40 are replaced with one another in arrangement.

Thus, the process of manufacturing the exhaust gas purifying catalyst according to the present embodiment comprises a step of forming the three-way catalyst layer 40 including the acid material 60 such as phosphorus on the cordierite carrier 10, a step of forming the absorbent agent block layer 30 formed of zeolite, etc. on the three-way catalyst layer 40, and a step of forming the absorbent catalyst layer 20 including the absorbent agent as alkali salt and the acid material 50 such as zeolite.

In the exhaust gas purifying catalyst according to the present embodiment that is constructed in the above-mentioned manner, the acid material 50 in the absorbent catalyst layer 20 and the absorbent agent block layer 30 inhibit the movement of the absorbent agent in the absorbent catalyst layer 20 to the three-way catalyst layer 40, and the absorbent agent having reached the three-way catalyst is transformed into a stable substance by the acid material 60 as is the case with the first embodiment. Thus, the absorbent agent has no adverse effect on the three-way catalyst layer 40. Therefore, the absorbent catalyst layer 20 including the absorbent agent and the three-way catalyst layer 40 including no absorbent agent can be formed on one carrier 10 to thereby form a single catalyst, which that can be manufactured at a low cost and execute the NOx absorbing function and the three-way function in a desired manner.

Third Embodiment

There will now be described an exhaust gas purifying catalyst according to the third embodiment of the present invention.

Figure 6:
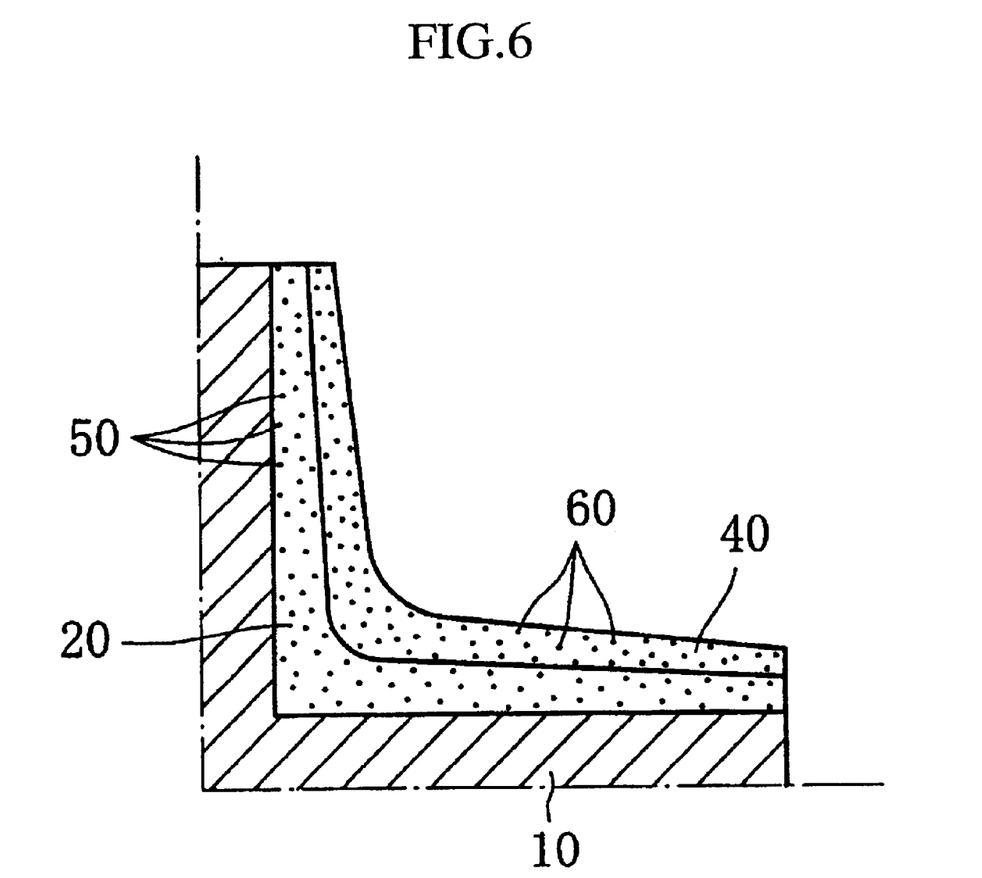
FIG. 6 is a local enlarged sectional view showing a quarter of one cell that is formed in an exhaust gas purifying catalyst according to the third embodiment.

As shown in FIG. 6, the exhaust gas purifying catalyst of the present embodiment has the same structure as that of the first embodiment except that the absorbent agent block layer 30 is omitted. Thus, the process of manufacturing the exhaust gas purifying catalyst of the present embodiment comprises a step of forming the absorbent catalyst layer 20 including the absorbent agent as alkali salt and the acid material 50 such as zeolite on the carrier 10 and a step of forming the three-way catalyst layer 40 including the acid material such as phosphorus.

The exhaust gas purifying catalyst that is constructed in the above-mentioned manner cannot achieve the absorbent agent movement inhibiting operation by the absorbent agent block layer 30 as has been described with regard to the first embodiment. However, the absorbent agent is fixed by the acid material 50 in the absorbent catalyst layer 20, and the acid material 60 in the three-way catalyst layer 40 transforms the absorbent agent into a stable substance. Therefore, the absorbent agent has no adverse effect on the three-way catalyst layer 40. Therefore, the absorbent catalyst layer 20 including the absorbent agent and the three-way catalyst layer 40 including no absorbent agent can be formed on one carrier 10 to thereby form a single catalyst, which can be manufactured at a low cost and execute the NOx absorbing function and the three-way function in a desired manner.

Fourth Embodiment

There will now be described an exhaust gas purifying catalyst according to the fourth embodiment of the present invention.

Figure 7:
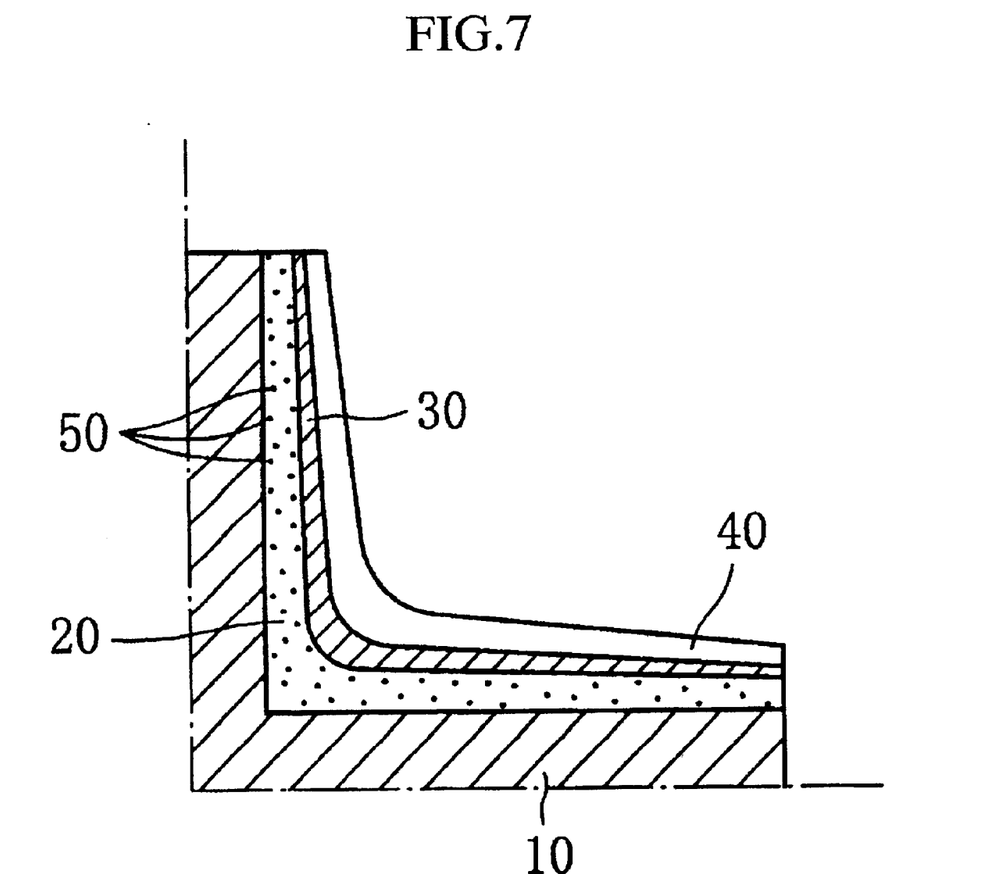
FIG. 7 is a local enlarged sectional view showing a quarter of one cell that is formed in an exhaust gas purifying catalyst according to the fourth embodiment.

As shown in FIG. 7, the exhaust gas purifying catalyst of the present embodiment has the same structure as that of the first embodiment except that the acid material 60 is omitted from the three-way catalyst layer 40.

Thus, the process of manufacturing the exhaust gas purifying catalyst of the present embodiment comprises a step of forming the absorbent catalyst layer 20 including the absorbent agent as alkali salt and the acid material 50 such as zeolite on the carrier 10 and a step of forming the three-way catalyst layer 40. Unlike the first embodiment, a slurry in which no acid material 60 such as phosphorus is mixed is used for forming the three-way catalyst layer 40.

The exhaust gas purifying catalyst that is constructed in the above-mentioned manner cannot execute the absorbent agent movement inhibiting operation by the absorbent agent block layer 30 as has been described with regard to the first embodiment; however, the acid material 50 in the absorbent catalyst layer 20 and the absorbent agent block layer 30 inhibit the movement of the absorbent agent in the absorbent catalyst layer 20 to the three-way catalyst layer 40. Thus, the absorbent agent has no adverse effect on the three-way catalyst layer 40. Therefore, the absorbent catalyst layer 20 including the absorbent agent and the three-way catalyst layer 40 including no absorbent agent can be formed on one carrier 10 to thereby form a single catalyst, which can be manufactured at a low cost and execute both the NOx absorbing function and the three-way function in a desired manner.

Fifth Embodiment

There will now be described an exhaust gas purifying catalyst according to the fifth embodiment of the present invention.

Figure 10:
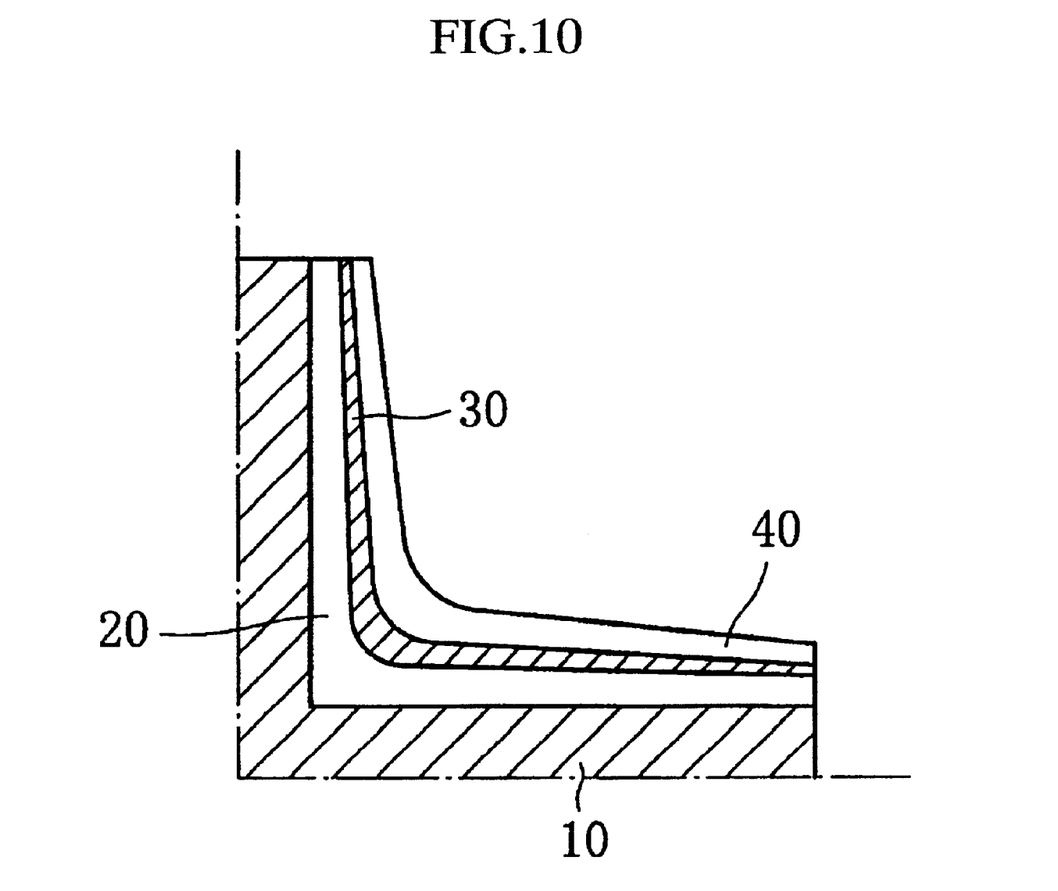
FIG. 10 is a local enlarged sectional view showing a quarter of one cell formed in an exhaust gas purifying catalyst according to the fifth embodiment.

As shown in FIG. 10, the exhaust gas purifying catalyst of the present embodiment has the same structure as that of the first embodiment except that the effect inhibiting materials (the acid materials 50, 60) is not added to the absorbent catalyst layer 20 and the three-way catalyst layer 40.

Thus, the process of manufacturing the exhaust gas purifying catalyst of the present embodiment comprises a step of forming the absorbent catalyst layer 20 including the absorbent agent as alkali salt, a step of forming the absorbent agent block layer 30 formed of zeolite on the absorbent catalyst layer 20, and a step of forming the three-way catalyst layer 40. Unlike the first embodiment, a slurry to which the acid materials 50, 60 are not added is mixed is used for forming the absorbent catalyst layer 20 and the three-way catalyst layer 40.

The exhaust gas purifying catalyst that is constructed in the above-mentioned manner cannot achieve the operation by the acid materials 50, 60 in the absorbent catalyst layer 20 and the three-way catalyst layer as has been described with regard to the first embodiment; however, the absorbent agent block layer 30 inhibit the movement of the absorbent agent in the absorbent catalyst layer 20 to the three-way catalyst layer 40. Thus, the absorbent agent has no adverse effect on the three-way catalyst layer 40. Even if the effect inhibiting materials such as the acid materials 50, 60 are not added to the absorbent catalyst layer 20 or the three-way catalyst layer 40, the absorbent agent block layer 30 is able to achieve an absorbent agent movement inhibiting effect to thereby sufficiently inhibit the effect of the absorbent agent on the three-way catalyst layer 40. For example, the absorbent agent block layer 30 has an effect inhibiting layer, to which an effect inhibiting material for inhibiting the effect of the absorbent agent on the three-way catalyst layer is added. The catalyst of the present embodiment is formed as a single catalyst by forming the absorbent catalyst layer 20 and the three-way catalyst layer 40 on the carrier. Moreover, the catalyst of the present embodiment is able to satisfactorily execute both the NOx absorbing function and the three-way function and has a great deal of flexibility when being assembled into an exhaust system.

It should be understood, however, that there is no intention to limit the invention to the first through fifth embodiments disclosed, but on the contrary, the invention is to cover all modifications, alternate constructions and equivalents falling within the spirit and scope of the invention as expressed in the appended claims. For example, the acid material 50 may be omitted from the absorbent catalyst layer 20 in the first embodiment, and the acid material 50 may be omitted from the absorbent catalyst layer 20 or the acid material 60 may be omitted from the three-way catalyst layer 40, respectively; and the acid material 50 may be omitted from the absorbent catalyst layer 20 or the acid material 60 may be omitted from the three-way catalyst layer 40 in the third embodiment. Further, the absorbent catalyst layer 20 and the three-way catalyst layer 40 may be replaced with each other in arrangement, and the three-way catalyst layer 40 may be formed between the carrier 10 and the absorbent agent block layer 30 and the absorbent catalyst layer 20 may be formed on the surface of the absorbent agent block layer 30. Further, the absorbent agent block layer 30 may be replaced with an effect inhibiting layer to which an effect inhibiting material for inhibiting the effect of the absorbent agent on the three-way catalyst layer 40 is added.

According to the above-mentioned embodiments, the honeycomb cordierite carrier 10 is used as the carrier, but the present invention may also be applied to an exhaust gas purifying catalyst having a carrier that is made of other material than cordierite. For example, the same operational effects can be achieved by using a metal carrier. Further, if the honeycomb cordierite carrier is used, the cells of the cordierite carrier should not necessarily be square but may also be triangle or hexagonal.

What is claimed is:

1. An exhaust gas purifying catalyst comprising:

a carrier;

an NOx absorbent catalyst layer; and a noble-metal containing catalyst layer, wherein at least one absorbent agent selected from a group of alkali metals and alkaline earth metals is added to said NOx absorbent catalyst layer, wherein an effect inhibiting material for inhibiting an effect of said absorbent agent on said noble-metal containing catalyst layer is contained in said NOx absorbent catalyst layer and inhibits movement of said absorbent agent to said noble-metal containing catalyst layer.

2. An exhaust gas purifying catalyst according to claim 1, wherein said effect inhibiting material is comprised of one or more materials selected from a group formed by an acid oxide including at least one acid substance selected from a group consisting of Group-IV, Group-V, and Group-VI transition elements and Group-IV, Group-V, and Group-VI non-transition elements; a complex oxide including said at least one acid substance; and such materials as not to disturb reaction of a nitrogen oxide and said absorbent agent.

3. An exhaust gas purifying catalyst according to claim 2, wherein said effect inhibiting material includes an acid oxide composed of at least one acid substance among silicon (Si) and tungsten (W).

4. An exhaust gas purifying catalyst according to claim 2, wherein said effect inhibiting material is contained in said noble-metal containing catalyst layer and transforms into a stable substance by reacting to said absorbent agent.

5. An exhaust gas purifying catalyst according to claim 4, wherein said effect inhibiting material includes at least one of silica ($SiO_2$), tungsten (W) and phosphorus (P).

6. An exhaust gas purifying catalyst according to claim 4, further including a blocking layer for inhibiting movement of said absorbent agent to said noble-metal containing catalyst layer, and said blocking layer is formed between said NOx absorbent catalyst layer and said noble-metal containing catalyst layer.

7. An exhaust gas purifying catalyst according to claim 2, further including a blocking layer for inhibiting movement of said absorbent agent to said noble-metal containing catalyst layer, and said blocking layer is formed between said NOx absorbent catalyst layer and said noble-metal containing catalyst layer.

8. An exhaust gas purifying catalyst according to claim 1, wherein said effect inhibiting material includes at least one of zeolite and titanium dioxide ($TiO_2$).

9. An exhaust gas purifying catalyst according to claim 1, wherein said effect inhibiting material is added to said noble-metal containing catalyst layer and transforms into a stable substance by reacting to said absorbent agent.

10. An exhaust gas purifying catalyst according to claim 9, wherein said effect inhibiting material comprises an acid material that transforms into a stable substance by reacting to said absorbent agent.

11. An exhaust gas purifying catalyst according to claim 10, wherein said effect inhibiting material includes at least one of silica ($SiO_2$), tungsten (W) and phosphorus (P).

12. An exhaust gas purifying catalyst according to claim 8, further including a blocking layer for inhibiting movement of said absorbent agent to said noble-metal containing catalyst layer, and said blocking layer is formed between said NOx absorbent catalyst layer and said noble-metal containing catalyst layer.

13. An exhaust gas purifying catalyst according to claim 1, further including a blocking layer for inhibiting movement of said absorbent agent to said noble-metal containing catalyst layer, and said blocking layer is formed between said NOx absorbent catalyst layer and said noble-metal containing catalyst layer.

14. An exhaust gas purifying catalyst comprising:
a carrier;
an NOx absorbent catalyst layer; and
a noble-metal containing catalyst layer; and
an effect inhibiting layer to which an effect inhibiting material for inhibiting movement of said absorbent agent to said noble-metal containing catalyst layer, and said effect inhibiting layer is formed between said NOx absorbent catalyst layer and said noble-metal containing catalyst layer;
wherein at least one absorbent agent selected from a group of alkali metals and alkaline earth metals is contained in said NOx absorbent catalyst layer.

15. An exhaust gas purifying catalyst according to claim 14, wherein said effect inhibiting layer is comprised of one or more materials selected from a group formed by an acid oxide including at least one acid substance selected from a group consisting of Group-IV, Group-V and Group-VI transition elements and Group-IV, Group-V, and Group-VI non-transition elements; a complex oxide including said at least one acid substance; and such materials as not to disturb reaction of a nitrogen oxide and said absorbent agent.

16. An exhaust gas purifying catalyst according to claim 14, wherein said effect inhibiting layer includes at least one acid substance between silicon (Si) and tungsten (W).

17. An exhaust gas purifying catalyst according to claim 14, wherein said effect inhibiting layer includes at least one of zeolite and titanium dioxide ($TiO_2$).

18. An exhaust gas purifying catalyst according to claim 14, wherein an effect inhibiting material for inhibiting movement of said absorbent agent to said noble-metal containing catalyst layer is contained in said NOx absorbent catalyst layer.

19. An exhaust gas purifying catalyst according to claim 18, wherein an effect inhibiting material that transforms into a stable substance by reacting to said absorbent agent is contained in said noble-metal containing catalyst layer.

20. An exhaust gas purifying catalyst according to claim 14, wherein an effect inhibiting material that transforms into a stable substance by reacting to said absorbent agent is added to said noble-metal containing catalyst layer.

21. A method for manufacturing an exhaust gas purifying catalyst comprising:
forming a first catalyst layer over a carrier; and
forming a second catalyst layer over the first layer,
wherein one of said first catalyst layer and said second catalyst layer comprises a NOx absorbent catalyst layer including at least one absorbent agent selected from a group consisting of alkali metals and alkaline earth metals,
wherein another of said first catalyst layer and said second catalyst layer comprises a noble-metal containing catalyst layer,
wherein an effect inhibiting material for inhibiting an effect of said absorbent agent on said noble-metal containing catalyst layer is added to at least one of said NOx absorbent catalyst layer and said noble-metal containing catalyst layer, and
wherein the second catalyst layer is the NOx absorbent catalyst layer and said first catalyst layer is said noble-metal containing catalyst layer.

22. A method for manufacturing an exhaust gas purifying catalyst as claimed in claim 21, wherein the first catalyst layer is the NOx absorbent catalyst layer and said second catalyst layer is said noble-metal containing catalyst layer.

23. A method for manufacturing an exhaust gas purifying catalyst comprising:
forming a first catalyst layer over a carrier;
forming an inhibiting layer over said first catalyst layer; and
forming a second catalyst layer over the first catalyst layer;
wherein one of said first catalyst layer and said second catalyst layer comprises a NOx absorbent catalyst layer including at least one absorbent agent selected from a group consisting of alkali metals and alkaline earth metals;

wherein the other of said first catalyst layer and said second catalyst layer comprises a noble-metal containing catalyst layer; and wherein said effect inhibiting layer includes an effect inhibiting material for inhibiting movement of said absorbent agent to said noble-metal containing catalyst layer.

24. A method for manufacturing an exhaust gas purifying catalyst as claimed in claim 23, wherein the first catalyst layer is the NOx absorbent catalyst layer and said second catalyst layer is said noble-metal containing catalyst layer.

25. A method of manufacturing an exhaust gas purifying catalyst as claimed in claim 23, wherein the second catalyst layer is the NOx absorbent catalyst layer and said first catalyst layer is said noble-metal containing catalyst layer.

* * * * *